No. 713,029. Patented Nov. 4, 1902.
S. T. & C. H. WELLMAN & J. McGEORGE.
MECHANISM FOR STRIPPING AND HANDLING INGOTS.
(Application filed Feb. 19, 1902.)
(No Model.) 2 Sheets—Sheet 1.
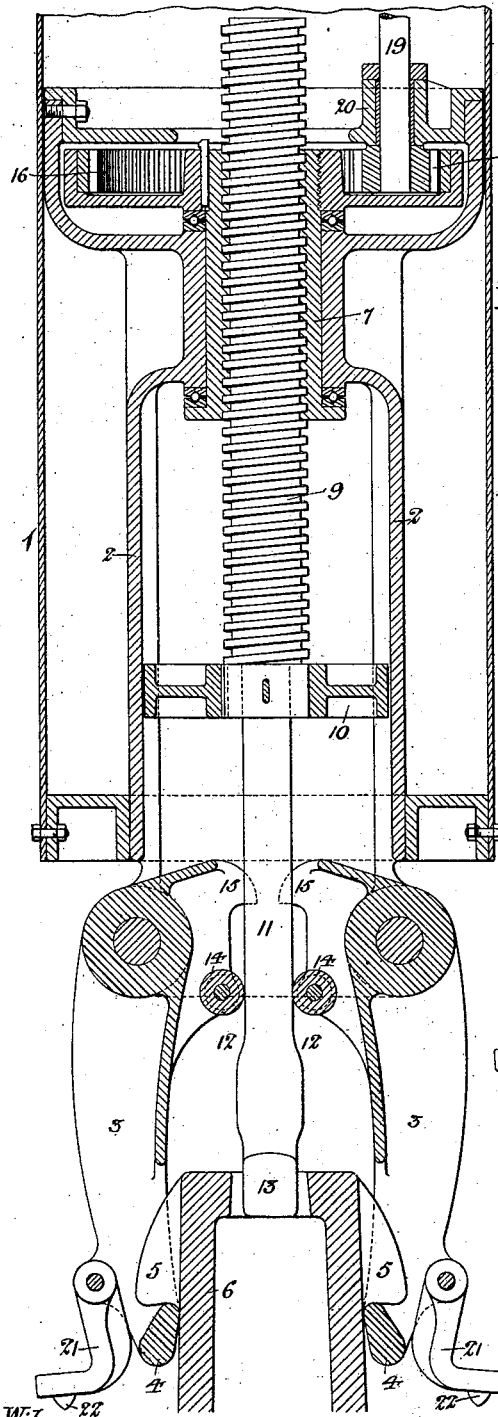
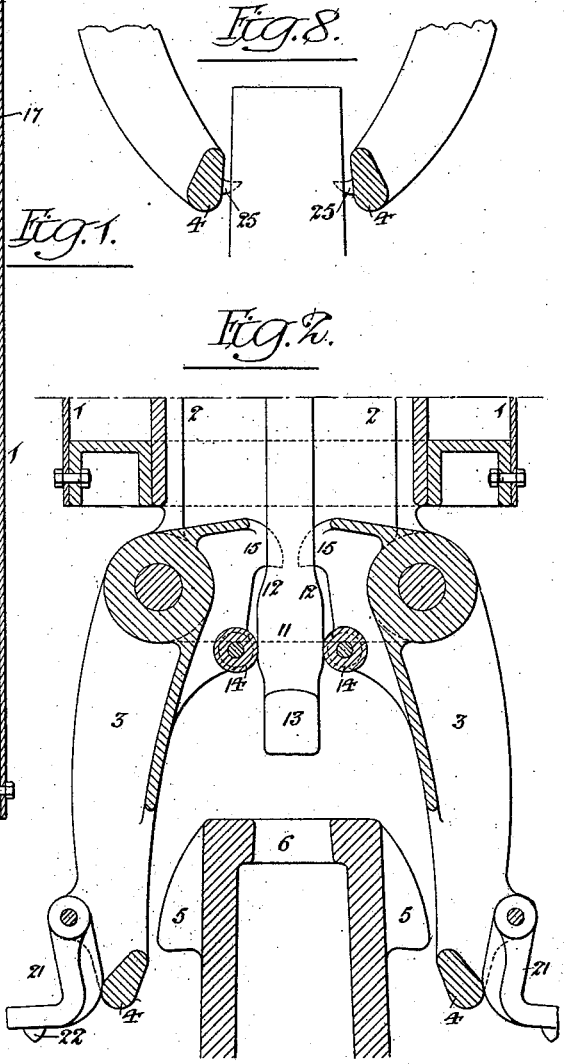
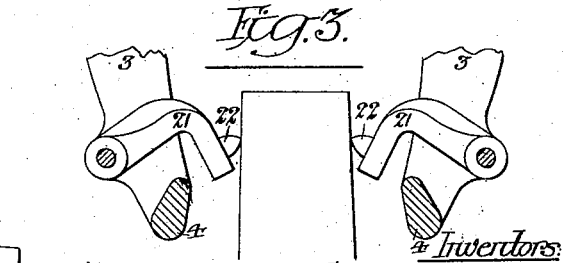

No. 713,029. Patented Nov. 4, 1902.
S. T. & C. H. WELLMAN & J. McGEORGE.
MECHANISM FOR STRIPPING AND HANDLING INGOTS.
(Application filed Feb. 19, 1902.)
(No Model.) 2 Sheets—Sheet 2.
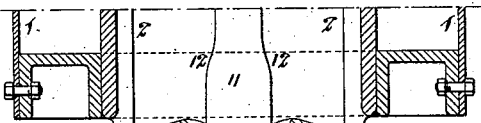
Fig. 4.
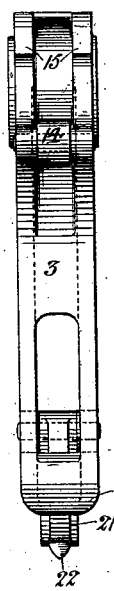
Fig. 5.
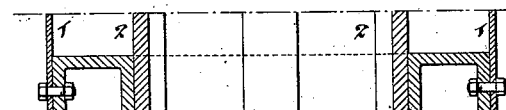
Fig. 6.
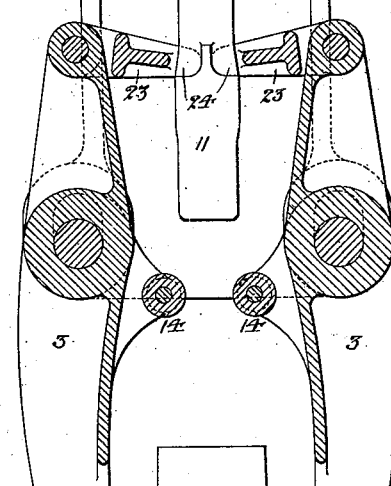
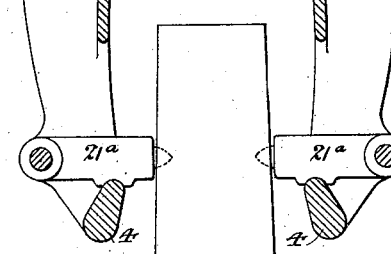
Fig. 7.
Witnesses:—
Herman E. Metius
A. B. Coppes
Inventors
Samuel T. Wellman,
Charles H. Wellman,
John McGeorge,
by their Attorneys
THE NORRIS PETERS CO., PHOTO-LITHO., WASHINGTON, D. C.

United States Patent Office.

SAMUEL T. WELLMAN, CHARLES H. WELLMAN, AND JOHN McGEORGE, OF CLEVELAND, OHIO, ASSIGNORS TO THE WELLMAN-SEAVER ENGINEERING COMPANY, OF CLEVELAND, OHIO, A CORPORATION OF OHIO.

MECHANISM FOR STRIPPING AND HANDLING INGOTS.

SPECIFICATION forming part of Letters Patent No. 713,029, dated November 4, 1902.

Application filed February 19, 1902. Serial No. 94,753. (No model.)

*To all whom it may concern:*

Be it known that we, SAMUEL T. WELLMAN, CHARLES H. WELLMAN, and JOHN MC-GEORGE, citizens of the United States, and residents of Cleveland, Ohio, have invented certain Improvements in Mechanism for Stripping and Handling Ingots, of which the following is a specification.

The object of our invention is to so construct ingot-stripping mechanism as to render the same also capable of handling the stripped ingots, whereby the latter may be conveyed from place to place and charged into or removed from a soaking pit or furnace. This object we attain in the manner hereinafter set forth, reference being had to the accompanying drawings, in which—

Figure 1 is a vertical sectional view of sufficient of an ingot-stripping machine to illustrate our invention, the parts being in the position assumed by them when about to strip the mold from the ingot. Fig. 2 is a view of part of the mechanism shown in Fig. 1, with the parts in position for releasing the ingot-mold. Fig. 3 is a view showing the first step in the operation of gripping the ingot. Fig. 4 is a view showing the final step in said operation. Fig. 5 is a side elevation of one of the gripping-jaws of the machine. Fig. 6 is a side elevation of a stripper-rod forming part of the machine. Fig. 7 is a view similar to Fig. 4, illustrating certain modifications of our invention; and Fig. 8 is a view illustrating another modification.

Referring in the first instance to Fig. 1 of the drawings, 1 represents a tubular casing depending from a crane or other suitable handling apparatus and containing a vertically-reciprocable hollow sleeve 2, having pivotal bearings at the lower end for a pair of jaws 3, yoked at the lower end, as at 4, so as to engage with ears 5 at the upper end of the ingot-mold 6.

Mounted in the sleeve 2, so as to be free to turn therein, but having no capacity for vertical movement, is a nut 7, to which is adapted a screw-stem 9, provided with a cross-head 10, vertically guided in the sleeve 2, whereby the screw-stem 9 is prevented from turning, but is free to move vertically.

Depending from the cross-head 10 is a rod 11, having cam portions 12 on opposite sides and a projecting head 13, the cam portions 12 being adapted to act upon antifriction-rollers 14, mounted upon the jaws 3, and the projecting head 13 being adapted to act upon ears 15, projecting inwardly from the upper portions of said jaws above the pivotal axes of the same.

Secured to the upper end of the nut 7 is an internally-toothed annular rack 16, with which meshes a spur-pinion 17, carried by the lower end of a vertical shaft 19, which is adapted to a suitable bearing 20 on the expanded upper end of the sleeve 2.

The crane or other structure is intended to be provided with means for raising and lowering the sleeve 2 and also with means for rotating the shaft 19. Hence the screw-stem 9 and its depending rod 11 may be raised and lowered with the sleeve 2, or by turning the nut 7 may be caused to have vertical movement independently thereof.

Hung to the lower portion of each jaw 3 of the machine is a pivoted dog 21, which when in its outer or inoperative position hangs down outside of the yoke 4 of said jaw, as shown in Fig. 1, but is capable of being thrown inward, so as to overlap said yoke and rest thereon, as shown in Fig. 4, each dog having a projecting spur 22 on that portion which is next to the ingot when the dog has been moved to the inner or operative position. (Shown in Fig. 4.)

In order to strip the ingot-mold from an ingot, the dogs 21 are thrown out of operative position and the sleeve 2 is adjusted so that the yokes 4 of its jaws 3 will engage with the ears 5 at the upper end of the ingot-mold, as shown in Fig. 1. The screw-stem 9 is operated so as to cause the head of the pusher-rod 11 to bear upon the top of the ingot, and the sleeve 2 being raised while the pressure of the rod 11 upon the top of the ingot is maintained the mold 6 will be loosened from the ingot, and if the sleeve 2 and presser-rod 11 are then raised together the mold will be stripped from the ingot, as shown in Fig. 1. If then the vertical movement of the sleeve 2 is arrested and vertical movement independently of said sleeve is imparted to the rod 11, the cam portions 12 of said rod will act upon the antifriction-rollers 14 of the jaws 3, as shown in Fig. 2, and will spread said jaws, so as to release their yokes 4 from engagement with the ears 5 of the ingot-mold, thus permitting the discharge of the latter from the stripper. If now the rod 11 is raised, so as to permit the jaws 3 to assume the position shown in Fig. 3, the sleeve and rod are then lowered, so that the yokes 4 of the jaws will pass down over the top of the stripped ingot and the dogs 21 are thrown inward, the spurs 22 of said dogs will engage with the upper portion of the ingot, and if the rod 11 is first raised, so as to clear the rollers 14, and the sleeve 2 is then lifted the dogs will be caused to bite into the ingot and will descend until they rest upon the yokes 4. The projecting head 13 of the rod 11 will, on the continuing upward movement of said rod, act upon the ears 15 of the jaws 3, so as to force their yokes 4 inwardly or toward the sides of the ingot, the result being the firm gripping and rigid support of the ingot, as shown in Fig. 4. Hence the said ingot can be lifted, carried, and deposited in a soaking-pit or other furnace, the release of the ingot from the control of the dogs being effected by a reversal of the above-described operations.

In that embodiment of our invention shown in Fig. 7 straight dogs 21ª are used instead of the bent dogs shown in the other figures of the drawings, and instead of providing for direct action of the rod 11 upon the jaws 3 the upper arms of said jaws are provided with swinging toggle-arms 23, the inner ends of which engage with sockets 24, formed upon said rod 11, and the construction and coöperation of the parts can be otherwise modified within the scope of our invention, one instance of such further modification being that shown in Fig. 8, wherein the gripping-dogs are dispensed with and the yokes 4 of the stripping-jaws are directly provided with spurs 25 for engaging with the ingot.

Having thus described our invention, we claim and desire to secure by Letters Patent—

1. The combination of the jaws of an ingot-stripping machine, having portions for engaging projections on the ingot-mold and means whereby said jaws may be caused to engage with and grip an ingot, substantially as specified.

2. The combination of the mold-engaging jaws of an ingot-stripping machine, with dogs constructed to engage an ingot, said dogs being mounted upon the jaws so as to be movable into and out of operative position thereon, substantially as specified.

3. The combination of the mold-engaging jaws of an ingot-stripping machine, with ingot-gripping dogs pivotally mounted upon said jaws, substantially as specified.

4. The combination of the jaws of an ingot-stripping machine, having yokes for engaging with the ears of the ingot-mold, with ingot-gripping jaws pivotally mounted upon said jaws and resting upon said yokes when in operative position, substantially as specified.

5. The combination of the mold-engaging jaws of an ingot-stripping machine, with an independently-movable stripper-rod having cam portions for acting upon said jaws so as to separate the same, and other portions for acting upon the jaws so as to positively move their gripping portions toward each other, substantially as specified.

6. The combination of the mold-engaging jaws of an ingot-stripping machine having portions for gripping an ingot, a stripper-rod movable independently of said jaws, and means whereby said stripper-rod is caused to operate the jaws so as to cause their gripping portions to engage with the ingot, substantially as specified.

7. The combination of the mold-engaging jaws of an ingot-stripping machine having portions for gripping an ingot a stripper-rod movable independently of said jaws, projecting ears on the jaws, and a projecting head on the rod constructed to engage said ears and cause the gripping portions of the jaws to engage with the ingot, substantially as specified.

In testimony whereof we have signed our names to this specification in the presence of two subscribing witnesses.

SAMUEL T. WELLMAN.
CHARLES H. WELLMAN.
JOHN McGEORGE.

Witnesses:
C. W. COMSTOCK,
HERBERT D. GLIDDEN.